United States Patent
Von Beichmann et al.

(10) Patent No.: US 9,355,380 B2
(45) Date of Patent: May 31, 2016

(54) SYSTEM AND METHOD FOR DETERMINING THE USE OR CONSUMPTION OF TANGIBLE PRODCUTS AND FOR DELIVERY ACCORDING TO USE OR CONSUMPTION

(75) Inventors: Boris Von Beichmann, Hamburg (DE); Günther A. Mohr, Bad Doberan (DE); Jörg Richter, Gusborn (DE)

(73) Assignee: EPPENDORF AG, Hamburg (DE)

( * ) Notice: Subject to any disclaimer, the term of this patent is extended or adjusted under 35 U.S.C. 154(b) by 56 days.

(21) Appl. No.: 13/492,609

(22) Filed: Jun. 8, 2012

(65) Prior Publication Data
US 2012/0312875 A1    Dec. 13, 2012

Related U.S. Application Data

(60) Provisional application No. 61/494,794, filed on Jun. 8, 2011.

(51) Int. Cl.
*G06Q 10/08*   (2012.01)
*G06Q 30/02*   (2012.01)

(52) U.S. Cl.
CPC .......... *G06Q 10/087* (2013.01); *G06Q 30/0201* (2013.01)

(58) Field of Classification Search
CPC ........... G06Q 10/087; G06Q 10/0833; G06Q 10/083; G06Q 10/08; G06K 19/07749; G06K 19/12; G06K 19/14; G06K 7/1404
USPC ..................... 235/385, 375, 487, 492; 340/8.1
See application file for complete search history.

(56) References Cited

U.S. PATENT DOCUMENTS

2008/0175390 A1 * 7/2008 Alessio et al. ............... 380/278
2011/0140850 A1 * 6/2011 Wassel et al. ................. 340/8.1

* cited by examiner

*Primary Examiner* — Kristy A Haupt
(74) *Attorney, Agent, or Firm* — Todd A. Lorenz; Arnold & Porter LLP

(57) ABSTRACT

The present invention relates to system and method for inventory management, more specifically to the tracking of use and/or consumption of tangible products at a user's location. In accordance with the invention, consumption data is determined and analyzed. Consumption data may include time-referenced and/or quantitative data about the tangible product, so that the origin/supplier is informed about the consumption behavior of the user.

21 Claims, 3 Drawing Sheets

A: stationary client

B: mobile client

A: stationary client

B: mobile client

SYSTEM AND METHOD FOR DETERMINING THE USE OR CONSUMPTION OF TANGIBLE PRODCUTS AND FOR DELIVERY ACCORDING TO USE OR CONSUMPTION

FIELD OF THE INVENTION

The present invention relates to system and method for inventory management, more specifically to the tracking of use and/or consumption of tangible products at a user's location.

BACKGROUND OF THE INVENTION

Businesses in product industries monitor inventory on a daily basis, generally monitoring the goods and materials held by a business for future sale, use or other type of transfer. Typically, these businesses engage in some type of inventory control to manage and maintain the proper amount of each good in stock or to provide the required service level of a product at a minimum cost. In one type of traditional inventory control system, a push system, an order for goods is issued for fulfillment with a supplier in specified quantities, by specified due dates, based on estimated lead-times. In another type of traditional inventory control system, a pull (consumption based) system, an order is placed with the supplier when the on-hand inventory balance reaches a specified level.

These traditional methodologies of inventory procurement and management are generally transaction intensive, requiring many manual processes in order to keep customers supplied with the stock they need for future sale, use, or other type of transfer.

In order to keep from running out of stock of a needed good and missing the delivery of a product incorporating the good to the customer as a result, it is common for suppliers to build excess inventory into their inventory control system to serve as a buffer to protect the supplier from being unable to deliver the required products. Additionally, the customer simultaneously orders and stores extra inventory to buffer against the suppliers inability to consistently deliver the required products. This excess inventory is an obvious economic liability.

Lean inventory systems, developed from lean manufacturing principles, can help address some of the problems associated with excess inventory and the waste created thereby. In lean inventory management systems, the emphasis is on customer demand, which pulls products through the system, as they are needed. As such, lean inventory systems are a type of pull system. In traditional lean inventory systems, the time required to produce a particular good is matched as closely as possible with the rate of customer demand, thus, reducing excess inventory. Generally, the rate of customer demand is based upon projections, such as usage from a previous measured time period. But because the rate of customer demand can be more dynamic than a given projection, it is difficult, if not impossible, to always match production delivery dates and quantities with actual customer demand.

It is therefore desirable to provide improved inventory control systems and methods.

SUMMARY OF THE INVENTION

The present invention generally provides improved inventory control systems and methods for tangible products. More particularly, in one aspect, the invention provides systems and methods for inventory management including the tracking of use and/or consumption of tangible products at a user's location.

In one aspect, a method for obtaining and analyzing data related to the consumption of tangible products at the point of first use and/or consumption is provided. The method generally comprises: providing a tracking device associated with one or more tangible products, the tracking device being adapted for determining data associated with identity and/or consumption information related to the one or more tangible products; optionally authorizing or enabling a user to utilize the tracking device; receiving and/or storing consumption data in a database at an origin of the one or more tangible products; and analyzing the consumption data to optimize manufacturing and/or supply processes.

In another aspect, a system for obtaining consumption data related to one or more tangible products is provided. The system generally comprises: (a) a tracking device associated with one or more tangible products, wherein the tracking device is adapted for determining data associated with identity and/or consumption information of the one or more tangible products; (b) an optional authorization module adapted to authorize a user to utilize the tracking device; (c) an identification module adapted to determine consumption data of the tangible product based, at least in part, on information obtained from the tracking device; and (d) a data processing module adapted to receive, to process and to transmit the consumption data to an origin/supplier of the tangible product.

These and other aspects will be apparent to those of skill in the art.

DETAILED DESCRIPTION OF THE INVENTION

The present invention generally relates to systems and methods for inventory management, more specifically to the tracking of use and/or consumption of tangible products at a user's location. Data related to the consumption of tangible products at a user's location are to be transmitted to the origin or supplier of such tangible products, so that a selective delivery of such tangible products can be enabled to the user. According to one embodiment, the systems and methods described herein are adapted to provide consumption data of a tangible product in real-time or at predetermined time periods.

Figure 1:
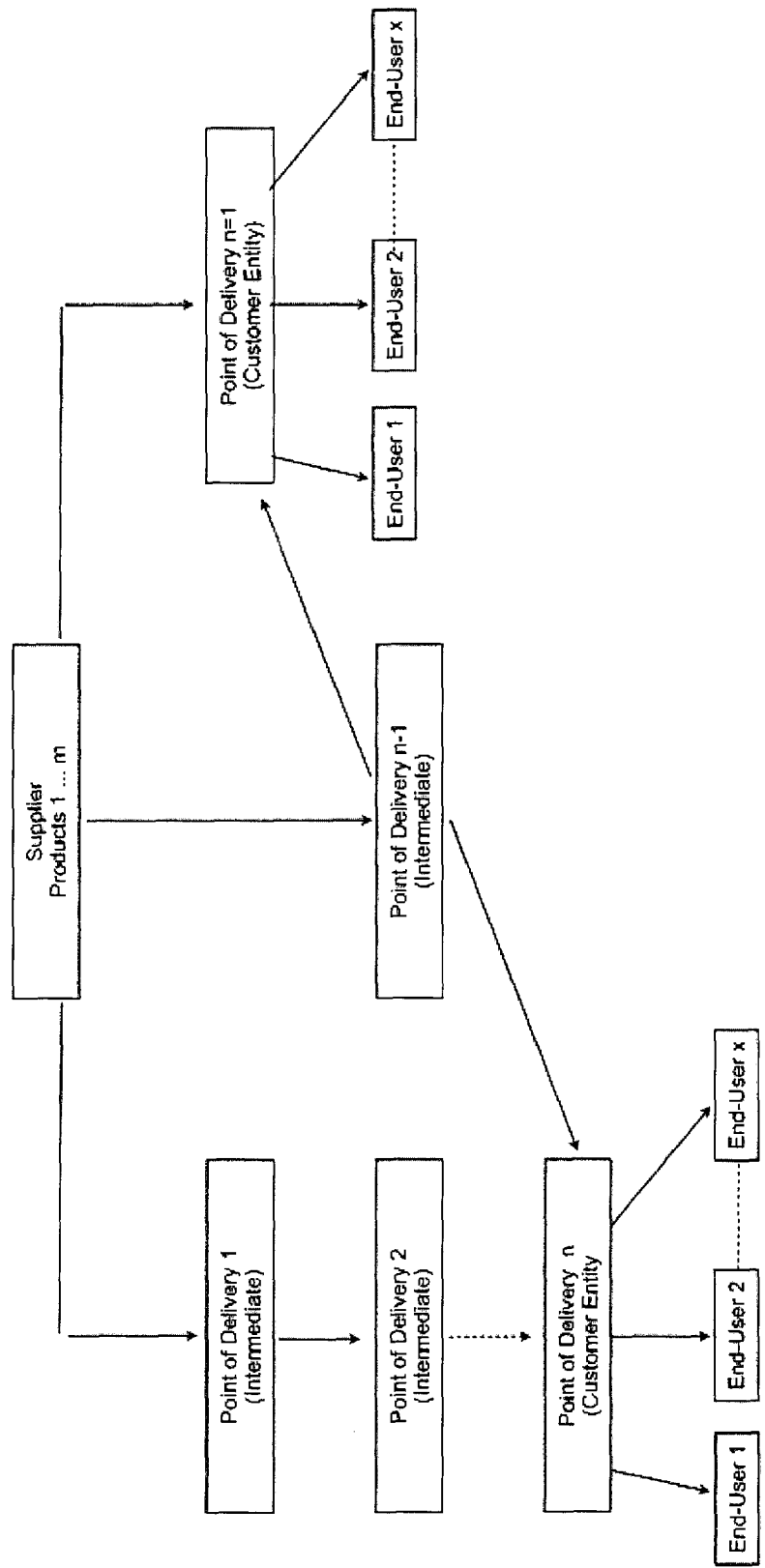
FIG. 1 shows a distribution/marketing network according to the state of the art (left part) and according to the invention (middle and right part).

In one aspect of the invention, consumption data are directly and in real-time available to a supplier by bypassing intermediate nodes according to FIG. 1. Collection of real-time consumption and/or end user data and transfer of such data to the origin of enables the supplier to optimize production, supply and/or delivery schedules. The left part of the scheme illustrated in FIG. 1 shows a network in which a supplier delivers products 1 . . . m through nodes, or intermediate points of delivery 1 . . . n to end users 1 . . . x, wherein the terminal point of delivery n is the customer entity representing the organization of said end users 1 . . . x. The middle and the right part of the scheme illustrated in FIG. 1 display alternative routes of supplying products 1 . . . m to end users 1 . . . x. End users may be positioned in various configurations relative to points of delivery, wherein intermediate points of delivery may be interconnected between suppliers and customer entities (middle part), or may be bypassed by a direct delivery from the supplier to the customer entity (right part). End users may also be supplied by different intermediate suppliers at the same time, e.g. for supply security or other reasons.

DEFINITIONS

For the clarity of understanding, the term "tangible product" or "tangible products" shall designate articles of commerce, which are repetitively used, such as, by way of example, bulk order items in large quantities or high value items. Bulk order items are typically delivered on daily, weekly or monthly intervals. High value items are typically associated with complex manufacturing, planning, or both. Tangible products include any kind of consumables. Consumables refer to any kind of consumer or technical fields covering for example, retail merchandise, clothing, cosmetics, cafeteria items, food items, mechanical applications, construction materials, e.g. bolts for construction, life sciences, technical, biological, medical, laboratories etc. Examples for consumables in the field of life sciences comprise e.g. hospital supplies, medication, pipette tips, dosing tips, reaction tubes, cuvettes, micro titer plates, reagents, chemicals, microarrays and comprising any kind of configuration into kits etc. into application bundles or packages or the like. Other fields may include pharmaceuticals or hospital supplies up to any other staple of commerce including foodstuff or the like. The skilled person is aware that any other suitable product may be envisaged in the present methods and systems.

The term "origin" and the term "supplier" shall designate any source of delivery, such as a manufacturing plant, the manufacturer's organization or any party having control over the logistics chain related to a tangible product, such as a distributor and/or any intermediate organization.

The terms "user" and "end-user" shall mean any person, whether natural or legal or whether known to the origin or not, which accounts for the usage or consumption of a/the tangible product. In this respect person(s) at the end of the value chain are considered, such as an individual at a work place, and/or an organizational entity, which is responsible for the supply and/or availability of tangible products for the individual's utilization. Such entity may be a warehouse, a purchase department or any other instance fulfilling supply management functions.

The term "consumption data" as used herein generally refers to any kind of data which may be related to tangible products, the tracking device and the respective user. Consumption data may for example comprise data about the identity of the tracking device, quantities of the tangible products used, identity of the tangible products used, individual, lot, batch, and/or type identifiers of the tangible products used, location information (workplace, laboratory, room etc.) of usage of the tangible products, and time of usage of the tangible products. In addition, consumption data may be allocated to the respective end-user person, e.g. the person using a pipette and pipette tips respectively, or a patient, to whom a tangible product has been administered. Consumption data may be subdivided in time-referenced data, comprising the end-user's identity, its location (including the precise geographical location), information and/or identity of the tangible products associated with the respective time of use, and/or quantitative data comprising the quantity of consumables used. Said data may be in form of data sets comprising an article identifier in form of one or more elements, including text, quantities, price per unit, and any other data set useful to fulfill the objective of the present invention.

A portable electronic device in the context of the present application may be understood for instance as a wireless handheld device capable of performing directly or indirectly RFID and/or barcode scanner functions and being capable of transporting information generated by these functions to the supplier, such as a custom RFID handheld scanner devices, tablet computers, IPads, smartphones, iPhones, etc., as generally understood by those of skill in the art, or any other suitable handheld devices capable of RFID and/or barcode scanner functions and data network communication. In certain aspects, such devices may connect to a wireless communication network, wireless local area network (WLAN), etc. utilizing any suitable communication protocol known in the art, including but not limited to: UMTS/HSDPA/HSUPA (850, 900, 1900, 2100 MHz), GSM/EDGE (850, 900, 1800, 1900 MHz), 802.11b/g/n Wi-Fi (802.11n), bluetooth or other suitable frequency-hopping spread spectrum (e.g., Bluetooth Version 2.1+EDR wireless technology). Alternate embodiments may utilize wireless USB (WUSB), such as Certified Wireless USB (CWUSB) for wireless communication.

In certain aspects, the systems and methods described herein may be configured as discrete applications or "apps", downloadable/installable onto a consumer smartphone or IPhone, as is understood by those skilled in the art. As described herein, programming, computer executable code, etc. may be implement by way of an "app". In certain embodiments, the systems of the invention and methods may be implements as an "app" that may be downloaded to a smartphone, IPhone, tablet computer, IPad, etc. as a complete application including all software and programming necessary to implement the functions described herein. In certain aspects, the inventory management system and method "app" of the present invention may include RFID scanner functions. In other aspects, the handheld device may include a separate RFID "app" with which the inventory management system and method "app" of the present invention interfaces.

The term "optional" or "optionally" as used herein refers to non-compulsory means or process-steps, which are insignificant for the function of the device or for performing the method, which however confer certain advantages in case if employed.

The term "remote" or "remote location" means a location other than the location at which the device is present or the method is performed. For example, a remote location could be another location (e.g., office, lab, etc.) in the same city, another location in a different city, another location in a different state, another location in a different country, etc. As such, when one item is indicated as being "remote" from another, what is meant is that the two items are at least in different rooms or different buildings, and may be at least one room, the same city, the same country, the same or a different continent.

The terms "determining," "measuring," "assessing," and "assaying" are generally used interchangeably, unless specifically indicated otherwise, and include both quantitative and qualitative determinations. The term "determining" may also encompass detecting, monitoring (e.g., evaluating changes in) and/or quantifying.

Unless indicated otherwise, it may be appreciated that terms such as "processing," "computing," "calculating," "determining," or the like, refer to the action and/or processes of a computer, processor, computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The expressions "computer," "processor" or "processing unit" are generally used interchangeably, unless specifically indicated otherwise, and each references any hardware or hardware/software combination which can control components as required to execute recited steps. For example a computer, processor, or processor unit includes a general purpose digital microprocessor suitably programmed to perform all of the steps required of it, or any hardware or hardware/software combination which will perform those or equivalent steps. Programming may be accomplished, for example, from a computer readable medium carrying necessary program code (such as a portable storage medium) or by communication from a remote location (such as through a communication channel).

A "memory" or "memory unit" refers to any device which can store information for retrieval as signals by a processor, and may include magnetic or optical devices (such as a hard disk, floppy disk, CD, or DVD), or solid state memory devices (such as volatile or non-volatile RAM). A memory or memory unit may have more than one physical memory device of the same or different types (for example, a memory may have multiple memory devices such as multiple hard drives or multiple solid state memory devices or some combination of hard drives and solid state memory devices).

To "record" data, programming or other information on a computer readable medium refers to a process for storing information, using any such methods as known in the art. Any convenient data storage structure may be chosen, based on the means used to access the stored information. A variety of data processor programs and formats can be used for storage, e.g. word processing text file, database format, etc.

The present systems and methods are based on the tracking of consumables from the point of the origin, such as a warehouse or other, not only to the storage location at the user level, but through to the point of use or consumption of the respective consumable—which in many instances is anonymous to the end-user. The method includes obtaining consumption data associated with tangible product(s), via tracking the tangible product(s) as close to the point of use as practicable. The data collected in this manner provide several advantages for the origin/supplier, including a reduction in administrative costs, storage costs, etc. The systems and methods also improve inventory control, and reduce and/or eliminate the need for interim distributors. In other aspects, the systems and methods enable project-oriented or person-oriented accounting.

The consumption data may comprise any suitable data useful in inventory management and control. For example, data related to the identity and the type of consumable/tangible product, the quantity and the type of the consumable/tangible product, location information relating to the place of usage of the consumable/tangible product, service times/intervals of use of the consumable/tangible product, etc.

In particular embodiments, the consumables/tangible products may be pipette tips, dosing tips, microarrays, cuvettes, micro titer plates and associated devices. However, the invention is not so limited. It should, however, be clear that the consumable article and the associated device are not limited to products of the field of life sciences and rather comprises all kinds of consumables.

The supplier of consumables/tangible products may also utilize consumption data in optimizing pricing models. In certain embodiments, flatrate pricing models may be formulated based on consumption data received, offering the possibility to isolate the supply chain from unnecessary accounting and financial transactions. In a flatrate model, a consumer may receive a predetermined amount of tangible products per predefined time unit, such as yearly, half-yearly, monthly or weekly, or any other predetermined time span. Such flatrates and related contracts may have different forms permitting the consumer to receive quantitative amounts of consumables in a way optimized by the systems and methods described herein. In additional embodiments, fixed payment installments may be included in the flatrate models over the time.

In certain aspects, known statistical methods, such as exponential smoothing, neural net based forecasting, Census X11, or other known multivariate analysis yielding forecasts may be used to determine future demand of a consumer based on consumption data obtained according to the systems and methods described herein. By way of non-limiting example, such future demands can then be used formulating and optimizing flatrate models.

If desired, the flatrate model may be adjusted based on consumption data (e.g., in real-time) so as to allow the user to surpass or fall below the predetermined volume amount. In certain aspects, the origin/supplier may receive consumption data indicating an increased or decreased demand for the consumable/tangible product, and the flatrate model may be optimized or in real-time, permitting the origin/supplier to react by e.g. the timing or amount of the next lot of consumable/tangible product may be altered based on demand. Such flatrates and associated contracts offer the possibility to reduce or even completely avoid an issuance of invoices, which confers to a further reduction of administration costs.

Figure 2:
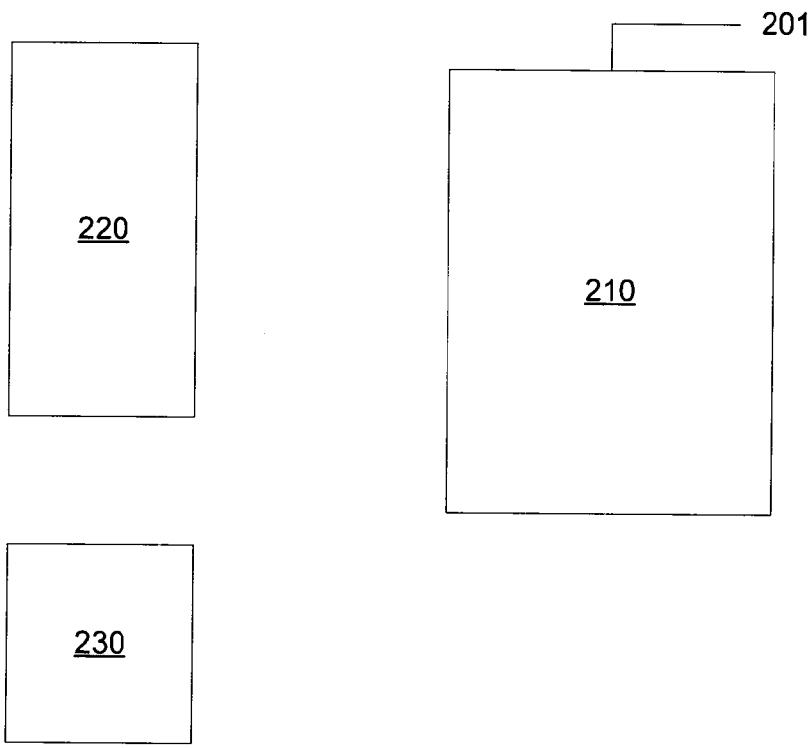
FIG. 2 illustrates an exemplary system of one embodiment described herein.

With reference to FIG. 2, in a first aspect of the present invention, system 200 for measuring/processing/transmitting of consumption data related to tangible product 201 is provided. The system 200 generally comprises a tracking device 210 associated with one or more consumable/tangible products 201. The tracking device 210 is generally adapted for determining data associated with identity and/or consumption information of one or more tangible products. System 200 may also optionally include an authorization module (not shown) for authorizing a user to utilize the tracking device 210. System 200 further includes an identification module 220 for determining consumption data of the tangible product 201 based, at least in part, on information obtained from the tracking device, and a data processing module 230 adapted to receive, to process and to transmit the consumption data to an origin/supplier of the tangible product 201.

The tracking device may be any suitable mechanism for permitting an identification of the kind of consumable/tangible product, as well as its amount used. The tracking device may be part of the tangible product or may be a stand-alone tracking device associated with or affixed to the tangible product. By way of non-limiting example, the tracking device may be connected to the tangible product or its packaging (e.g., containing one or more of the tangible product), such as a radio frequency identification (RFID) tag or chip attached to a box containing the product. In certain embodiments, the tracking device may comprise any suitable tracking device known in the art, for example, an optical, mechanical and/or electric identification system, such as an RFID tag or chip, magnetic unit, or barcode (e.g., barcode label, barcode tag, barcode imprint, etc.), etc.

In certain embodiments, a tangible product may individually be provided with a tracking device. Any suitable tracking device may be used, including optical, mechanical and/or electric identification systems known in the art. By way of non-limiting example, an RFID tag or chip, magnet unit, or a barcode may be utilized. Such individual tagging of tangible products may be in particular applied for high value tangible products; perishable tangible products, e.g., tangible products with expiration dates of use; tangible products, which should be individually traceable for instance for quality management and controlling; and the like. For instance, pharmaceuticals may be individually traceable. In case of tracking devices individually provided with tangible products, the tracking devices may store individual product related information including, for instance, an individual identifier of the product such as a serial number, a type identifier indicating the kind of product, a lot identifier relating to the production lot, an expiration date and/or further product individual and product type specific information.

In other embodiments, multi-item packagings including several tangible products of the same kind may be provided with a single tracking device. A single tracking device provided with multi-item packagings may be in particular applied for tangible products of bulk or lower value; high usage frequency, e.g., high consumption rate; and/or tangible products, which individual tracking is not desired or required. For instance, the provision of individual, e.g., RFID tags for medical supplies such as dressing material or laboratory supplies of high usage rate (e.g., pipette tips) delivered in large multi-item packagings would not be reasonably proportionate to the expenses of individual tagging and the benefit thereof. In case of, e.g., RFID tags provided with multi-item packagings, the RFID tags may store product type related information including for instance a type identifier indicating the kind of product, a lot identifier relating to the production lot, an expiration date and/or further packaging and product type specific information.

The optional authorization module may include any suitable manner to permit the identification and authorization of a user. The module may be adapted to allow or deny complete or partial access to the system (e.g, access to the identification module, etc.), if a user does not provide proper authentication/authorization. Such authentication may be, for example, obtained via use of passwords, SIM cards, or any other suitable means, including optical pattern recognition systems or other electronic means known in the art. In one embodiment, the authorization module may comprise an exchangeable or non-exchangeable chip, which is preferably selected from the group consisting of a suitable device, e.g., RFID chips or SIM cards, finger print readers or any other user identify scanning devices.

The identification module may be any suitable optical, mechanical and/or electric identification mechanism for determining consumption data of the tangible product (based on the tracking device, as recognized by those of skill in the art). Preferably, the respective identification mechanism is selected from RFID tag/chip readers, magnet unit readers, barcode readers, etc. According to an embodiment, the identification module comprises sensor means (e.g., RFID or barcode reader), a CPU/processor, database/storage, a communication interface (e.g., wired or wireless including bluetooth, Wi-Fi, WUSB, cellular, etc), and computer executable code for processing and transmitting consumption data.

The data processing module for receiving, processing and transferring data about the consumable to the origin, may generally comprise a CPU/processor, communications interface (e.g., wired or wireless including bluetooth, WUSB, Wi-Fi, cellular, etc), database/storage, etc. Such data processing module may comprise hardware and software generally known to those of skill in the art. The data processing module may further comprises a network. The network may comprise nodes for communicating information/data in accordance with any suitable wired or wireless protocol known in the art.

In one embodiment, the data processing module comprises wired and/or wireless communication interface(s), storage means (e.g., a database), computer executable code for processing and transmitting consumption data. The identification module may interface with or comprise the data processing module (i.e., the identification module may comprise the data processing module, or the data processing module may be a stand-alone module with which the identification module is in communication). By way of non-limiting example, IDBLUE, Canada, mobile RFID solutions may be used as a preferred RFID scanner/reader in connection with the identification module of the present invention.

Figure 3:
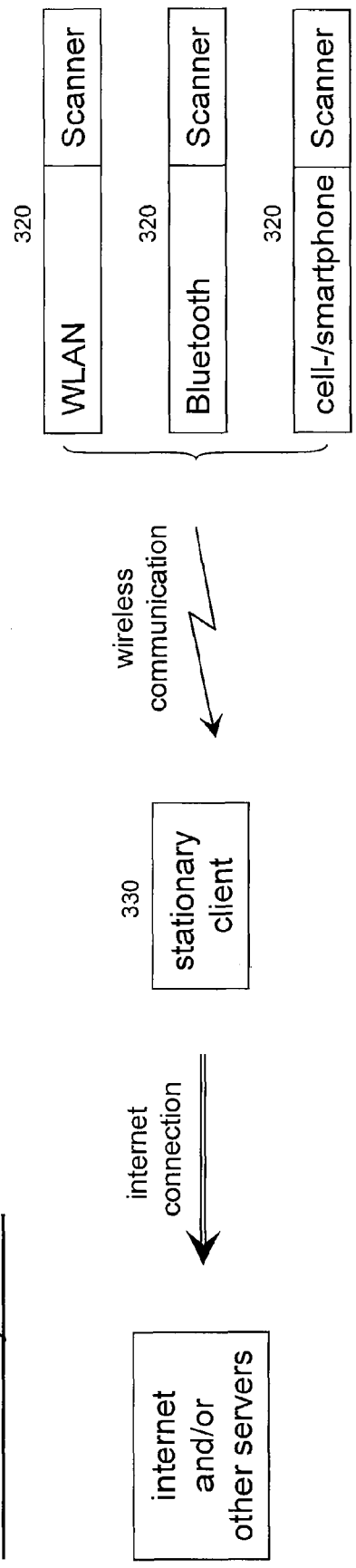
FIGS. 3A and 3B illustrate exemplary identification module/data processing module configurations, according to embodiments described herein.
Figure 3:
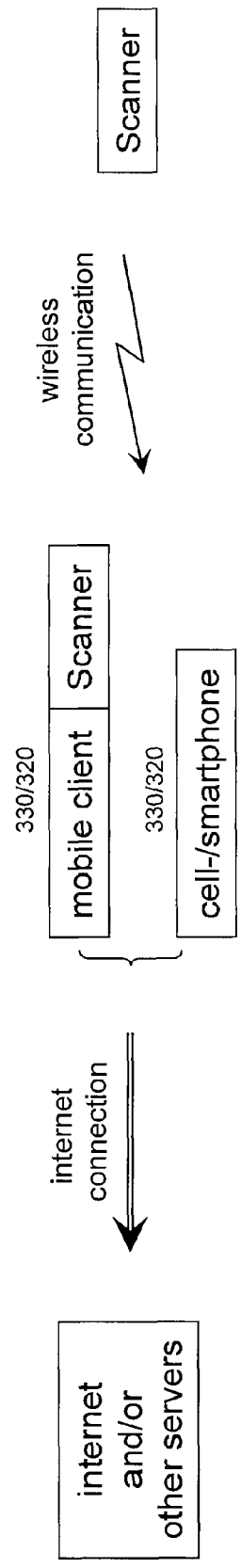

With reference to FIG. 3A, in certain embodiments, the identification module 320 may communicate with a stationary data processing module 330 via any suitable communication protocol, e.g., WLAN, bluetooth, cellular, WUSB, etc. When identification module 320 is unable to communication with stationary data processing module 330, consumption data is temporarily stored within identification module 320, and transferred as bulk data to data processing module 330 once communication is established. The data processing module 330 then communicates via the internet/network to a remote server/database (not shown).

With reference to FIG. 3B, in certain embodiments, the identification module 320 and data processing module 330 are configured as a single, mobile unit, which communicate via any suitable communication protocol, e.g., WLAN, bluetooth, cellular, WUSB, etc., to a remote server/database (not shown).

In other aspects (not shown), the system may include a cradle, docking station or the like, with which the identification module may interface. In certain aspects, the cradle or docking station may provide power charging and/or may enable or enhance communications, e.g., with the stationary data processing module or the remote server/database. For example, in certain embodiments, if wireless communication is interrupted, the identification module may be placed into a cradle or docking station to provide a direct link to a wired communication network. The wired communication network may then communicate with the remote server/database, etc.

In other embodiments, the identification module may be an apparatus (e.g., laboratory device) suitable for high-throughput and/or low throughput use, wherein the apparatus is adapted for use with the consumable/tangible product. The apparatus may be configured to comprise an optical, mechanical and/or electric identification mechanism for determining consumption data of the tangible product(s). For instance, the apparatus may be configured to comprise an RFID scanner to read RFID tags of a tangible product upon use in connection with the apparatus. The apparatus may also be configured to comprise a data processing module as described herein or may be configured to interface/be in communication with such data processing module.

According to one particular embodiment, the apparatus may be, by way of example, a liquid handling devices including dosing units, devices for the detection of optical and/or non-optical signals, devices permitting treatment or delivery of substances/compositions; devices for separating components and/or hybridization devices. Preferably, the liquid handling device is a single- or multi-channel pipette. Preferably, the devices for the detection of optical and/or non-optical signals are selected from the group consisting of a fluorometer, colorimeter and spectrometer.

The information/data stored in the tracking devices may generally be obtained by the identification module wirelessly. In certain embodiments, line of sight between the identification module and the tracking device is not required. For example, when RFID is utilized, the interrogating radio frequency field may be optimized to allow for coverage without direct line of sight. Moreover, RFID reader devices may be provided at several different locations.

For instance, RFID reader devices may be arranged at particular points of access, such storage facilities including cabinets, refrigerator and the like to enable registering storage and/or removal of tangible products individually provided with RFID tags and/or multi-item packagings with RFID tags. RFID reader devices may be further arranged at places of usage/consumption of the tangible products such as workplaces, laboratory work stations, at the bed side, treatment rooms and the like. The RFID reader devices at the places of usage/consumption allow for registering and tracing the usage/consumption up to the finale place of usage/consumption.

Different implementations of RFID tags are available, which among others include writing and/or erasing functionality. Erasing functionality may be made use of in conjunction with multi-item packagings, but not being limited thereto. RFID tags provided with multi-item packagings may be erased upon storage, removal, or first use thereof. Writing functionality may be made use of in conjunction with tangible products provided with individual RFID tags, but not being limited thereto. The individual RFID tags of the tangible products provided therewith may be written with information relating to the storage or removal including for instance location of storage, date/time of storage and/or removal, identifier indicating that the tangible products must not be delivered further to another location and the like. Without limiting thereto, erasing and/or writing of information at RFID tags may be performed automatically upon storage and/or removal, upon entering an interrogating radio frequency field at the place of usage/consumption, by the device, at which a tangible product with RFID tag is used, or manually upon input of a user at an RFID reader device or a device being equipped with RFID reader functionality. Varied levels of access control and reading access, e.g., via password protection, to information stored on the RFID tag may be utilized as well.

The communication protocol framework which is applied to communication between RFID reader devices and RFID tags may also implement collision prevention mechanism, which allows one RFID reader device for successive access to multiple RFID tags arranged at the same time within the coverage of the interrogating radio frequency field of the one accessing RFID reader device. This mechanism may for instance be used for inventory control on demand or for searching one or more specific tangible products, which may be for instance useful in conjunction with a recall action. For example, tangible products of a specific lot have to be identified. The storage facilities, at which the tangible products are stored, are equipped with RFID reader devices. For this, the RFID reader devices at the storage facilities may be configured to retrieve lot and type information from all RFID tags, which are individually provided with tangible products or multi-item packagings. On the basis of the retrieved information, it can be determined whether tangible products of a specific lot and/or type are stored at the storage facilities.

The following describes advantages of identification modules attached to tangible products or their packaging containing one or more tangible product. However, those of skill will recognize that pipettes and pipette tips are referred to as examples of tangible/consumable products, and the invention is not so limited.

As aforementioned, the RFID tags employed as tracking devices may be attached to pipettes or pipette tips, which represent exemplary tangible products. Alternatively or additionally, RFID tags are attached to packaging containing pipettes or pipette tips. The RFID tags may be scanned by portable or stationary RFID readers or RFID scanners (i.e., identification modules) and information stored in the RFID tags attached to pipettes or pipette tips may be obtained. By way of example, information stored in the RFID tags attached to the packaging containing the pipettes or pipette tips may be obtained when removing the packaging from the place of storage, e.g. a stock, storage room, storage cabinet and the like, upon use at the laboratory workbench, etc. If desired, information from RFID tags attached to the product, i.e. the pipettes or pipette tips, and the information from RFID tag attached to the packaging may be separately handled.

On the basis of the information obtained from the RFID tag or RFID tags, a supplier or distributor of the pipettes or pipette tips is identifiable. For instance, the supplier or distributor may be directly coded in the information obtained from the RFID tag, or the information is associable with the supplier or distributor via database lookup. Consumption data may then be processed through to the origin/supplier via the data processing module.

For instance, in one embodiment, the data processing module may provide the consumption data to the origin/supplier, or at least a part of the information thereof, in an email, which may have, for instance, a specific form enabling automatic parsing of the email by the supplier. The email may be sent to a predetermined email address or through a web page. Alternatively and/or additionally, consumption data may be transmitted via text or multimedia messaging services such as MMS (Multimedia Messaging Service), SMS (Short Message Service), voice message, facsimile, or communicated and uploaded to a database (as a new or updated data record, e.g., as SQL content), etc. The format/end point may depend on information obtained from the RFID tag and/or the supplier, etc. The database may be a database local to the end user, a database remote to the end user (e.g., a database at the origin/supplier location or at a location in communication with the origin/supplier). Any suitable data communication protocols known to the person skilled in the art may be used.

It should be understood that the above exemplified data processing is by way of non-limiting example, and may be performed in any combination or in any sequence. For instance, the generation/insertion of a new data record in a database may trigger the generation of an email and transmission of the email to the origin/supplier. Vice versa, the generation of an email and transmission of the email to the origin/supplier may trigger the generation/insertion of a new data record in a database. Further, the extraction of information as contained in the messages (e.g., email, text, MMS, SMS, etc) received at an origin/supplier can be, e.g., performed by parsing the message, extracting the information and storing it in a database for further processing, by a database query or queries when such data directly or indirectly have been appended to a database, or by any other kind of data manipulation known in the art. By way of non-limiting example, the parsing of emails can be performed by an email parser, which is commercially available, such as from ITH Integration Technologies Group, Inc., Falls Church, Va. or other.

The consumption data may also comprise information additional to that associated with the tangible product. For instance, the consumption data may include the place of utilization, information about the owner/user of the RFID reader or RFID scanner, the storage place, the department at which the utilization has took place and the like. The information about the owner/user of the RFID reader or RFID scanner may further include, e.g., an identifier of the owner or user, a correspondence or response address of the owner or user, e.g., an email address, and information about the department at which the RFID reader or RFID scanner is installed or used.

In other embodiments, consumption data may be also sent to several email address or inserted in several databases or data collections. For instance, one or more further entities, organizations, organization units or departments may be informed about the utilization. The further entities, organizations, organization units or departments may for instance comprise the department at which the utilization has took place, a purchasing department, an accounting department, a statistics department, a logistics department etc, and/or a responsible person thereof. In certain aspects, the consumption data provided may differ depending on the party to which the information is being provided. For instance, information about the place of utilization may not be provided to the origin/supplier, but may be provided to one or more of the purchasing department, the accounting department, the statistics department and the logistics department of the end user, etc.

Consumption data may be stored in libraries. Details of library design and preparation are discussed in U.S. Pat. No. 5,776,359, U.S. Pat. No. 5,959,297, U.S. Pat. No. 5,985,356, U.S. Pat. No. 6,030,917, U.S. Pat. No. 6,034,775, and U.S. Pat. No. 6,149,882, each of which is incorporated by reference herein. The consumption data may be implemented and presented in any commercially available relational and/or query database such as SQL, such as those offered by Oracle, Sybase, Informix, IBM or the like according to a predetermined mapping schema.

It is noted that the above examples of use have been described with reference to RFID tags as the tracking device. However, those skilled in the art will immediately understand on the basis of the description that any other suitable tracking device and identification module may be alternatively or additionally used in combination with the exemplary embodiments. It is for instance immediately apparent that barcodes/barcode scanners may be utilized, etc.

In another aspect, a method for obtaining and analyzing data related to the consumption of tangible products at the point of first use and/or consumption is provided. The method generally comprises: providing a tracking device associated with one or more tangible products, the tracking device being adapted for determining data associated with identity and/or consumption information related to the one or more tangible products; optionally authorizing or enabling a user to utilize the tracking device; receiving and/or storing consumption data in a database at an origin of the one or more tangible products; and analyzing the consumption data to optimize manufacturing and/or supply processes.

In one embodiment, the method includes initializing, resetting, and/or decommissioning the tracking device for use with the one or more tangible products. As described herein, the tracking device may include read and write capabilities. In certain embodiments, the methods may include creation, modification, and/or deletion of information stored in the memory of the tracking device. By way of example, in one instance, the tracking device may be initialized for first use upon receipt of a tangible product. In one embodiment, the tracking device may be "authorized" and initialized. In other embodiments, the tracking device may be written with desired information (identity, location, date, etc.) so as to identify and/or facility analysis of the consumption data at the point of origin, etc. In other examples, information on the tracking device may be modified upon use. For instance, date of first use/opening may be recorded, date of last use/discard may be recorded, etc. In yet another example, the tracking device may be erased upon removal/use from storage such that additional scanner/information modules do not record its use, etc.

In certain embodiments, the method is performed in real-time or at predetermined time intervals. In other embodiments, the consumption data are time-referenced and/or quantitative data. The consumption data preferably comprise data about the identity of the tangible product, number of the tangible products used, identity of the tangible products used, point in time the tangible products are used, and/or service times/intervals of the tangible products, etc.

According to a particular embodiment, the method further comprises, delivering the tangible product based, at least in part, on analyzed consumption data. In other words, tangible products are delivered to the end user/consumer an amount based, at least in part, on an analysis of the consumption data obtained, e.g., future demand is determined based at least in part on the consumption data obtained. Alternatively, delivery may be slowed, accelerated, increased, decreased, (size/volume/quantity etc.), in case a surplus or shortage of consumables is indicated to the seller or origin based on consumption data obtained. In this manner, a flatrate model may be utilized, yet dynamically optimized based on real-time consumption data.

Other aspects relate to non-transient computer readable media containing computer executable code adapted for executing some or all steps of methods described herein, when run on a computer, processor or digital assistant. The computer readable media may be, for example, in the form of a computer disk or CD, a floppy disc, a magnetic "hard card", a server, or any other computer readable media capable of containing data or the like, stored electronically, magnetically, optically or by other means. Accordingly, stored programming embodying steps for carrying-out functions of the subject devices may be transferred to a subject device or to a computer coupled to a subject device such as a personal computer (PC) or portable processing device such as a smart phone or any other touch screen based device, (i.e., accessible by an operator or the like), by physical transfer of a CD, floppy disk, or like medium, or may be transferred using a computer network, server, or other interface connection, e.g., the Internet.

Beside the respective hardware for performing the present system and method respective software may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

The invention claimed is:

1. A method for formulating and/or optimizing a flatrate pricing model for one or more tangible products, the method comprising:
   (a) providing a tracking device associated with one or more tangible products, the tracking device being adapted for determining data associated with identity and/or consumption information related to the one or more tangible products at a point of first use and/or consumption by a consumer of said one or more tangible products;
   (b) authorizing or enabling a user to utilize the tracking device;
   (c) providing an identification module adapted to determine consumption data of the tangible product based, at least in part, on information obtained from said tracking device, wherein said identification module comprises a sensor, storage/database, CPU/processor, and a communication interface;
   (d) receiving and/or storing consumption data in a database at an origin of the one or more tangible products; and
   (e) formulating and/or optimizing the pricing model based on the consumption data.

2. The method according to claim 1, which method is performed in real-time or intermittently at predetermined time intervals.

3. The method according to claim 1, wherein the consumption data are time-referenced and/or quantitative data.

4. The method according to claim 1, wherein the consumption data comprise data related to at least one of the identity of the one or more tangible products, the number of the one or more tangible products used, and/or the usage times of the one or more tangible products.

5. The method according to claim 1, further comprising delivering one or more tangible products based at least in part of the analysis of the consumption data.

6. The method according to claim 5, wherein the future demand for said one or more tangible products is estimated based, at least in part, on said consumption data.

7. The method according to claim 6, wherein delivery is optimized based on the estimated future demand.

8. The method according to claim 5, wherein delivery is modified upward or downward based, at least in part, on analysis of the consumption data.

9. The method according to claim 1, wherein the tracking device is an RFID tag, magnet unit, or a barcode.

10. The method according to claim 9, further comprising initializing the tracking device prior to first use.

11. The method according to claim 10, wherein said initializing comprises writing information.

12. The method according to claim 1, further comprising analyzing the consumption data to optimize manufacturing and/or supply processes associated with said one or more tangible products.

13. The method according to claim 1, wherein the consumer receives a predetermined amount of the one or more tangible products per a predefined time unit.

14. The method according to claim 13, wherein the predefined time unit is selected from: one year, six months, one month, and one week.

15. The method according to claim 13, further comprising adjusting the flatrate pricing model based on the consumption data in real-time.

16. The method according to claim 15, wherein the consumer receives an amount of the one or more tangible products other than the predetermined amount and/or per a time unit other than the predefined time unit.

17. The method according to claim 1, wherein the flatrate pricing model comprises fixed payment installments.

18. The method according to claim 1, further comprising determining a future demand of the one or more tangible products based on the consumption data.

19. The method according to claim 18, wherein the future demand of the one or more tangible products is determined using a multivariate analysis technique.

20. The method according to claim 19, wherein the multivariate analysis technique is selected from: exponential smoothing, neural net based forecasting, and Census X11.

21. The method according to claim 18, wherein the flatrate pricing model is based on the future demand of the one or more tangible products.

* * * * *